April 15, 1924.
E. NIELSEN
1,490,340
TRANSMISSION FOR GRINDERS
Filed Jan. 10, 1922
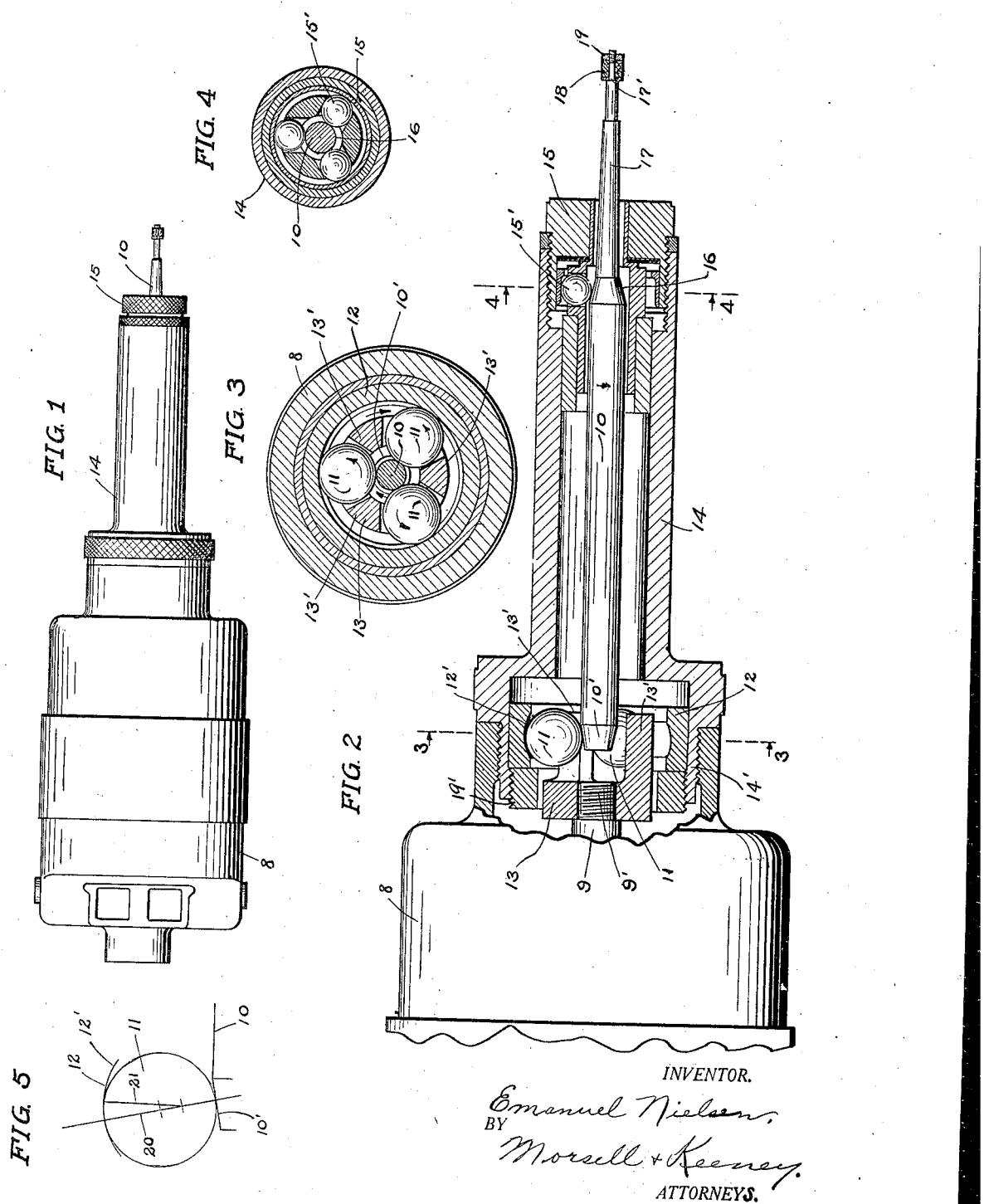
INVENTOR.
Emanuel Nielsen,
BY Morsell + Keeney
ATTORNEYS.

Patented Apr. 15, 1924.

1,490,340

UNITED STATES PATENT OFFICE.

EMANUEL NIELSEN, OF RACINE, WISCONSIN, ASSIGNOR TO HAMILTON-BEACH MFG. CO., OF RACINE, WISCONSIN, A CORPORATION OF WISCONSIN.

TRANSMISSION FOR GRINDERS.

Application filed January 10, 1922. Serial No. 528,273.

*To all whom it may concern:*

Be it known that I, EMANUEL NIELSEN, a citizen of the United States, and resident of Racine, in the county of Racine and State of Wisconsin, have invented new and useful Improvements in Transmissions for Grinders, of which the following is a description, reference being had to the accompanying drawings, which are a part of this specification.

This invention relates to improvements in transmissions for grinders and more particularly to electric grinders of the high speed type.

Grinding wheels of comparatively small diameter require a speed of ten to eighty thousand revolutions per minute to efficiently perform their work and as small electric motors particularly adapted for this purpose have armatures which revolve at considerably less speed it is necessary to provide a means for transmitting the speed of rotation of the motor armature at a greatly increased rate of speed to the grinder. The use of gears for increasing the speed has not been found very satisfactory due to the size and number of gears and the wear and noise at high speed.

It is one of the objects of the present invention to overcome the before mentioned objectional features and provide a transmission while more particularly adapted for grinders may also be used for other purposes.

A further object of the invention is to provide a transmission for grinders in which the grinding wheel is in axial line with the motor armature and is driven at a greatly increased rate of speed without the use of gears.

A further object of the invention is to provide a transmission for grinders in which spherical members or balls are used as bearings for the grinder shaft and as a means for increasing the speed of rotation of the said shaft.

A further object of the invention is to provide a transmission for grinders in which the bearing parts are adapted to automatically move into driving engagement with each other to positively transmit motion at the grinding end of the shaft at a greatly increased rate of speed.

A further object of the invention is to provide a transmission for grinders in which the gearless planetary mechanism consist in part of a plurality of balls positively driven by the motor and arranged to transmit motion to the grinder shaft in a noiseless manner and at a greatly increased rate of speed, said balls also serving as a bearing for the shaft.

A further object of the invention is to provide a transmission for grinders which is of simple construction, is strong and durable and is well adapted for the purpose described.

With the above and other objects in view the invention comprises the improved transmission for grinders and its parts and combinations as set forth in the claims and all equivalents thereof.

In the accompanying drawing in which the same reference characters indicate the same parts in all of the views:

Fig. 1 is a top view of the improved transmission shown in connection with an electric motor;

Fig. 2 is a longitudinal sectional detail view, on a larger scale, of the front portion of the motor and the transmission connected thereto;

Fig. 3 is a transverse sectional view thereof taken on line 3—3 of Fig. 2;

Fig. 4 is a transverse sectional view taken on line 4—4 of Fig. 2; and

Fig. 5 is a diagrammatic view illustrating the manner in which planetary transmission balls automatically move into driving engagement with the grinder shaft.

Referring to the drawing the numeral 8 indicates an electric motor, 9 the armature shaft having a threaded end portion 9' and 10 the grinder shaft in axial alinement therewith. The transmission means between the said shafts comprises a plurality of spherical members or balls 11, preferably three in number, which are positioned around and bear on the tapered inner end portion 10' of the grinder shaft 10. A retaining collar or ball race member 12 surrounds the balls 11 and its inner curved bearing surface 12' is so positioned with relation to the tapered end 10' of the grinder shaft that, when the balls are rotated, centrifugal force will cause said balls to move radially outwardly and firmly bear against the collar and the tapered shaft and frictionally transmit motion to the grinder shaft. An extension member 13 threaded on the end portion 9' of the shaft 9 is formed with three equally spaced and outwardly projecting arms 13' which extend between the balls 11 and maintain them in spaced relation while impelling them around the race member 12. When thus impelled the balls will roll in the direction indicated in Fig. 3 and the engagement of the inner portion of the balls with the conical end portion of the grinder shaft 10 will rotate said shaft in the same direction as the extension member 13 at a greatly increased rate of speed due to the greater diameter of the balls over the diameter of the portion of the shaft 10 engaged and the travel of the balls in the same direction as the shaft.

A tubular casing extension 14 having an enlarged inner end threaded portion 14' which is threaded into the motor casing 8 concentric with the axis of the motor armature, is provided with a threaded outer cap portion 15. Said outer end portion is also provided with a ball bearing 15' which engages a tapered reduced diameter portion 16 of the grinder shaft, and the reduced outer end portion 17 of said shaft extends through the bearing and cap to receive a small grinding wheel 18 thereon. The grinding wheel is maintained in position on the shaft by being clamped between the shaft shoulder 17' and a nut 19 threaded on the end of the shaft. The end portion of the shaft is of stepped formation to hold grinding wheels with larger diameter openings.

The inner bearing 12 is mounted within the enlarged inner end portion 14' of the tubular extension and is maintained in position by a collar 19' which is threaded into said end portion 14' and bears against the race member 12.

It will be noted that the speeding up transmission and ball bearing occupies but a small amount of space and the shafts are in direct axial alinement with relation to each other, and that the transmission parts may be easily attached to the motor.

Referring particularly to Fig. 5 it will be noted that the radius 20 of the bearing ball 11 is less than the radius 21 of the curve 12' of the race member so that although the ball may be loosely positioned in the bearing it will be automatically moved radially outwardly by centrifugal force and wedge between the conical portion 10' and the curved portion 12' and form a frictional driving engagement therebetween.

From the foregoing description it will be seen that the transmission for grinders is adapted for high speed work and is particularly adapted for grinder work.

What I claim as my invention is:

1. A transmission mechanism, comprising a driving shaft, a fixed race member positioned concentrically with relation to said shaft, a driven shaft in axial alinement with the driving shaft, and a ball means loosely positioned between the race member and the driven shaft and automatically moved when rotated to drivingly engage the driven shaft.

2. A transmission mechanism, comprising a driving shaft, a fixed race member having an inner curved surface, a driven shaft in axial alinement with the driving shaft and having outer and inner tapered portions concentric with relation to the race member, balls interposed between the inner tapered shaft portion and the curved portion of the race member, means connected to the driving shaft and engaging the balls for causing said balls to transmit motion at an increased rate of speed from the driving shaft to the driven shaft, and a ball bearing means engaging the outer tapered shaft portion.

3. A transmission for grinders, comprising a motor shaft provided with forwardly projecting arms, a race member surrounding the arms and having an inner inclined surface, a driven shaft extending between the arms and having outer and inner beveled portions, rotatable members interposed between the race member and the inner tapered portion of the shaft and between the arms of the driving member, and a ball bearing means engaging the outer tapered shaft portion.

4. A transmission for grinders, comprising a motor shaft provided with forwardly projecting arms, a race member surrounding the arm, a tubular casing extension surrounding the race member and extending forwardly therefrom and having a ball bearing in its outer end portion, a shaft extending through and having a tapered portion which engages the bearing and provided with an inner tapered portion which extends between the arms, a grinding wheel on the outer end shaft portion, and bearing and transmission balls interposed between the race member and the inner tapered end of the shaft and between the arms of the motor shaft.

5. A transmission for grinders, comprising a motor shaft provided with forwardly projecting arms, a tubular casing extension surrounding the arms and projecting forwardly therefrom and having a ball bearing in its outer end, a grinder shaft extending through the ball bearing and having a tapered portion engaged by the bearing, the outer end portion of said grinder shaft having means for holding a grinding wheel and the inner end of the shaft having an oppositely tapered portion positioned between the motor shaft arms, a ball race member mounted in the extension member and surrounding the arms, and driving and transmission balls interposed between the tapered shaft portion and the race member and between the arms of the motor shaft.

6. A transmission for grinders, comprising a motor shaft provided with forwardly projecting arms, a tubular casing extension surrounding the arms and projecting forwardly therefrom and having a ball bearing in its outer end, a grinder shaft extending through the ball bearing and having a tapered portion engaged by the bearing, the outer end portion of said grinder shaft having means for holding a grinding wheel and the inner end of the shaft having a tapered portion positioned between the motor shaft arms, a ball race member mounted in the extension member and surrounding the arms, and driving and transmission balls interposed between the tapered shaft portion and the race member and between the arms of the motor shaft, the bearing surface of said race member being curved in an arc greater than the diameter of the transmission balls and being so positioned with relation to the tapered portion of the grinder shaft as to permit the balls to wedge therebetween by centrifugal force.

7. A transmission for grinders, comprising a motor shaft provided with forwardly projecting arms, a tubular casing extension surrounding the arms and extending forwardly therefrom and having a cap in its outer end, a ball bearing in said cap, a grinder shaft extending through the ball bearing and the cap and having a tapered portion engaged by the bearing, the outer end portion of said grinder shaft having means for holding a grinding wheel and the inner end of the shaft being tapered and positioned between the motor shaft arms, a ball race member mounted in the inner end of the extension member and surrounding the arms and having an inner bearing surface curved in cross section, and driving and transmission balls interposed between the tapered shaft portion and the curved portion of the race member and between the arms of the motor shaft, the curved portion of the race member being so positioned with relation to the inner tapered end of the grinder shaft as to permit the balls to wedge therebetween by centrifugal force.

In testimony whereof, I affix my signature.

EMANUEL NIELSEN.